United States Patent [19]
Saxon

[11] Patent Number: 5,758,359
[45] Date of Patent: May 26, 1998

[54] METHOD AND APPARATUS FOR PERFORMING RETROACTIVE BACKUPS IN A COMPUTER SYSTEM

[75] Inventor: Paul David Saxon, Auburn, Wash.

[73] Assignee: Digital Equipment Corporation, Maynard, Mass.

[21] Appl. No.: 736,450

[22] Filed: Oct. 24, 1996

[51] Int. Cl.$^6$ .................................................. G06F 17/30
[52] U.S. Cl. ............................. 707/204; 395/182.04
[58] Field of Search ................................ 707/202, 204; 711/161, 162; 395/180, 182.04

[56] References Cited

U.S. PATENT DOCUMENTS

| | | | |
|---|---|---|---|
| 5,241,670 | 8/1993 | Eastridge et al. | 395/180 |
| 5,276,860 | 1/1994 | Fortier et al. | 395/182.04 |
| 5,446,884 | 8/1995 | Schwendemann et al. | 707/202 |
| 5,497,483 | 3/1996 | Beardsley et al. | 395/180 |
| 5,642,496 | 6/1997 | Kanfi | 711/162 |

Primary Examiner—Thomas G. Black
Assistant Examiner—John C. Loomis
Attorney, Agent, or Firm—Ronald C. Hudgens

[57] ABSTRACT

A mechanism for performing retroactive backups in a computer system is presented. The retroactive backup mechanism employs a backup policy dictating that certain backups are to be performed at set times and for set backup levels, but subject to user-defined selection criteria so that the backups are of a retroactive nature. The selection criteria comprises a retroactive backup date upon which the scheduled backup is made effective. It is selected to correspond to the backup date of a previous backup or save set. Alternatively, the retroactive backup date upon which the scheduled backup is made effective is determined by controlling the amount of data to be backed up. Thus, the selection criteria comprises a maximum size threshold, selected by a user or system administrator as the amount of data that can be backed up in an allotted backup time. The retroactive backup copies to a new save set only data that has not been modified or deleted since the date indicated as the retroactive backup date.

11 Claims, 6 Drawing Sheets

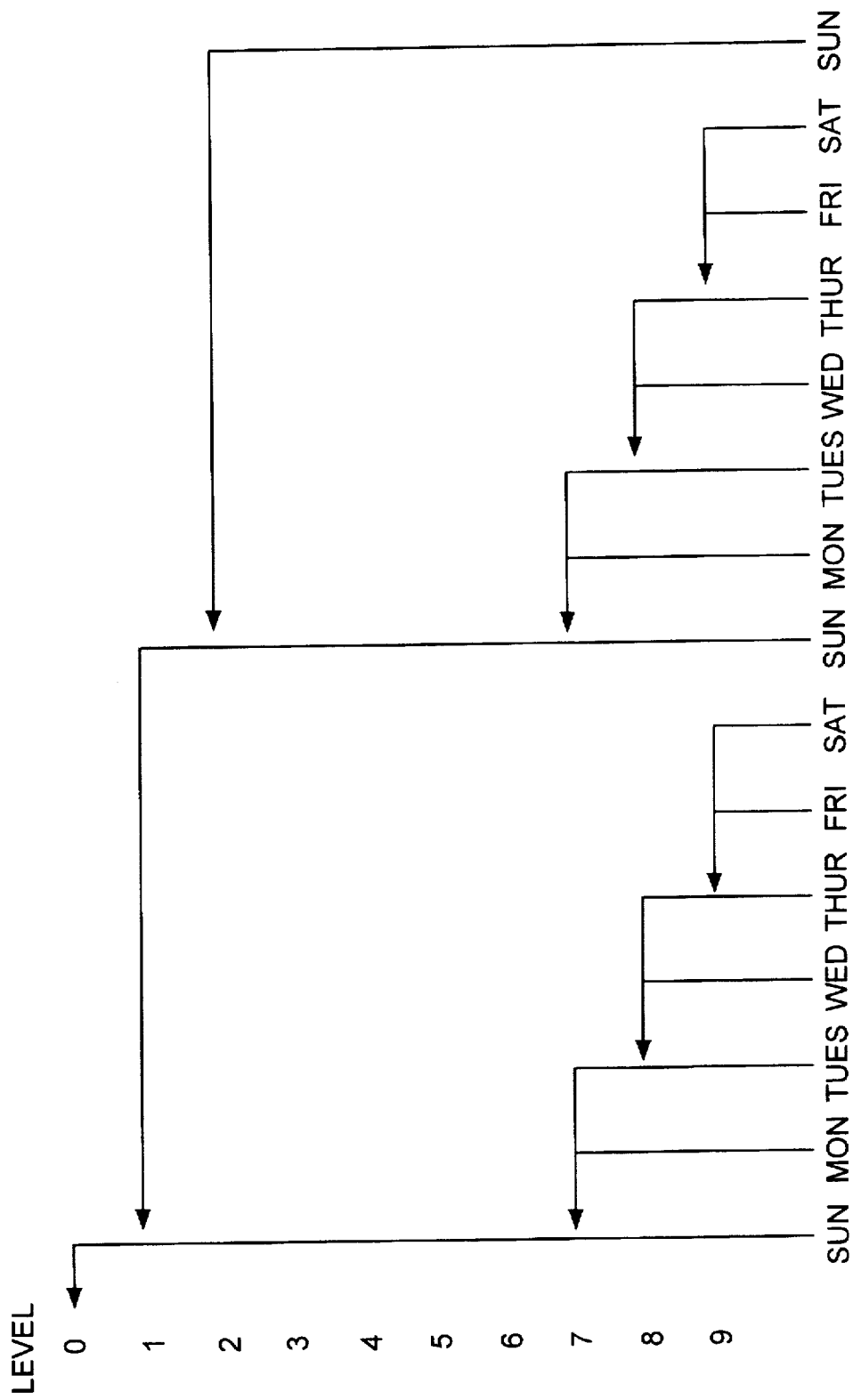

|  | S | M | T | W | T | F | S |
|---|---|---|---|---|---|---|---|
| MONTH 1: | 0 | 8 | 8 | 8 | 9 | 9 | 7 |
|  | 3 | 8 | 8 | 8 | 9 | 9 | 7 |
|  | 4 | 8 | 8 | 8 | 9 | 9 | 7 |
|  | 5 | 8 | 8 | 8 | 9 | 9 | 7 |
|  | 6 | 8 | 8 | 8 | 9 | 9 | 7 |
| MONTH 2: | 1 | 8 | 8 | 8 | 9 | 9 | 7 |
|  | 3 | 8 | 8 | 8 | 9 | 9 | 7 |
|  | 4 | 8 | 8 | 8 | 9 | 9 | 7 |
|  | 5 | 8 | 8 | 8 | 9 | 9 | 7 |
|  | 6 | 8 | 8 | 8 | 9 | 9 | 7 |
| MONTH 3: | 2 | 8 | 8 | 8 | 9 | 9 | 7 |
|  | 3 | 8 | 8 | 8 | 9 | 9 | 7 |
|  | 4 | 8 | 8 | 8 | 9 | 9 | 7 |
|  | 5 | 8 | 8 | 8 | 9 | 9 | 7 |

FIG. 5

METHOD AND APPARATUS FOR PERFORMING RETROACTIVE BACKUPS IN A COMPUTER SYSTEM

FIELD OF THE INVENTION

The present invention relates generally to computer systems, and more particularly to performing efficient data backups on computer systems.

BACKGROUND OF THE INVENTION

In a computer system, files can be lost or damaged in a variety of ways. They can be corrupted by viruses, accidently deleted or overwritten by users, or destroyed when a disk or an entire system fails. The capability to recover data structure and content of files in a file system of a computer system in the event of such failure is therefore critical. By making backup copies in accordance with a carefully planned and executed backup strategy, the amount of information that will be lost when files need to be restored from backup media is minimized. During a backup, data copied from an input volume or disk is written to a special file called a save set on a storage medium, such as computer tape, which is stored away from the computer system. Thus, if the entire computer system fails, the data needed to bring the system back up can be restored from the backup copy.

Backup policies include policies of scheduling. They determine the frequency and range of backup operation. One common technique used to ensure continued availability of data sets or files is to perform periodic full backups. This type of policy maintains a manageable number of save sets, but can be detrimental to system performance, as a full backup is time-consuming and therefore tends to monopolize the CPU for a lengthy period of time. This problem is partially remedied by partial backups, in which only some files are copied, or a type of partial backup known as an incremental backup, which records only those changes (file additions, deletions and modifications) that have occurred since the last full or incremental backup. A third policy involves a staggered mix of full and partial backup, wherein multiple levels of backup copies made over time provide efficient file system protection. Under most typical multiple level backup approaches, the present or near-present state of the computer system is stored in a collection of many save sets composed of full level and many partial backups.

Where a system administrator implements only an incremental policy, restoration of a single volume of data may require recovering data from a large number of backup save sets. While this type of backup method saves system data in an efficient manner and enables a user to restore different versions of files, complete system restoration can be a long process if a large number of save sets have been created during the backup cycle. The more backup tapes that have to be located and mounted for a full recovery, the longer the recovery time. Even partial recoveries of specific files can be lengthy if the files to be recovered are spread over too many tapes. A full backup policy suffers the obvious disadvantage of long-time occupancy of the system as already indicated, while a mixed policy still results in a spreadout of backup volumes and more backup time than an incremental policy alone would require.

The dilemma of balancing efficient backup sessions, where few full saves and many partial saves are performed, with efficient system recoveries, where many full saves and few partial saves are performed, is usually resolved in favor of reducing backup time due to the fairly infrequent need for full system recovery. Unfortunately, this solution leaves a system administrator to face a more difficult save set management task and the system user to face more lengthy recovery times, the frequency of which cannot be underestimated. Therefore, there remains a need in the art for a technique that offers a reasonable compromise between backup time and system recovery time.

SUMMARY OF THE INVENTION

Accordingly, it is an object of the invention to mitigate the impact of backup time, particularly backup time associated with normally time-consuming full backups, on computer system operation.

It is yet another object of the invention to maintain at an acceptable number the number of save sets required for recovery.

In accordance with the purposes of the invention, as embodied and described herein, the above and other purposes are attained by a method and corresponding apparatus for performing computer system backups according to a backup policy made sensitive to adjustable selection criteria, whereby the backup is taken retroactively.

Generally, the invention features a method of retroactively backing up files stored in a computer system by identifying any save sets created since the last lower level save set or, alternatively, the last same level save set if the scheduled level is the lowest level, when a backup is scheduled to occur at an established backup level. If any such save sets are identified, the method then ascertains which of the identified save sets has files eligible for backup by testing attributes associated with the files in the identified save sets against the selection criteria until the selection criteria has been satisfied. Once the selection criteria has been satisfied, the eligible files are backed up at the scheduled level to create a new save set. The new save set is dated as if it was taken on the backup date of the most recent of the identified files having eligible files.

In one embodiment of the present invention, the backup policy is made sensitive to selection criteria comprising a preselected retroactive backup date. The retroactive backup date is preselected by the user or system administrator to correspond to a backup date associated with a previous backup or save set. The step of ascertaining which of the identified save sets has files eligible for backup comprises examining the associated file attributes of the files in the identified save sets, identifying the one or more of the identified save sets created on or prior to the retroactive backup date, and then selecting as eligible those files from each of the identified save sets that have not been subsequently modified or deleted. Thus, a backup to be performed at a scheduled level is taken for data modified only prior to a specified "retroactive" date. For the purposes of file restoration, a backup at the scheduled level appears to have been taken on that date.

In an alternative embodiment of the present invention, the retroactive date upon which the scheduled backup is made effective is determined by controlling the amount of data to be backed up. Therefore, the backup policy is made sensitive to selection criteria comprising a maximum size threshold, selected by the user or system administrator as the amount of data that can be backed up in an allocated backup time slot.

In this embodiment, the step of ascertaining which of the identified save sets has files eligible for backup comprises a number of steps as follows. First, the attributes associated with the identified save sets and files stored therein are examined. Next, files not subsequently modified or deleted are selected from each identified save set. The sizes of the selected files in each identified save set are then added to give a new save set size. Once the new save set sizes have been computed, the method computes a total size by adding together the new save set sizes. The total size is compared to the maximum size threshold. If the total size exceeds the maximum size threshold, then several steps are performed repeatedly, beginning with the most recent of the identified save sets, until the total size falls within the size limit specified by the maximum size threshold. These steps include: determining that there is a "next" most recent save set; eliminating the most recent of the identified save sets by subtracting the new save set size of the most recent save set from the total size, thereby making the next most recent save set the most recent save set; and comparing the total size to the maximum size threshold. The selected files on the remaining of the identified save sets are thus deemed eligible for backup.

As a compromise between the need to coalesce backup data into fewer save sets and the need to conserve time, the retroactive backup scheme of the present invention offers several advantages. With this scheme, there is never the need to replicate all data or even all data that would normally be coalesced for a particular time period. By taking a particular level save to be performed on a specific date retroactively, data that has been captured in subsequent incrementals or deleted since the specific date is not replicated as it would have been if the level save had been taken on that date. As a result, less time is spent needlessly replicating changed data already captured on more recent save sets. At the same time, an acceptable level of coalescing is achieved.

BRIEF DESCRIPTION OF THE DRAWINGS

The above objects, features and advantages of the present invention will become more apparent from the following description of the embodiments of the present invention illustrated in the accompanying drawings, wherein:

FIG. 2 shows the level of data backed up in full and partial level backups;

FIG. 5 is an exemplary backup schedule for performing quarterly backups.

DESCRIPTION OF THE PREFERRED EMBODIMENT

Figure 1:
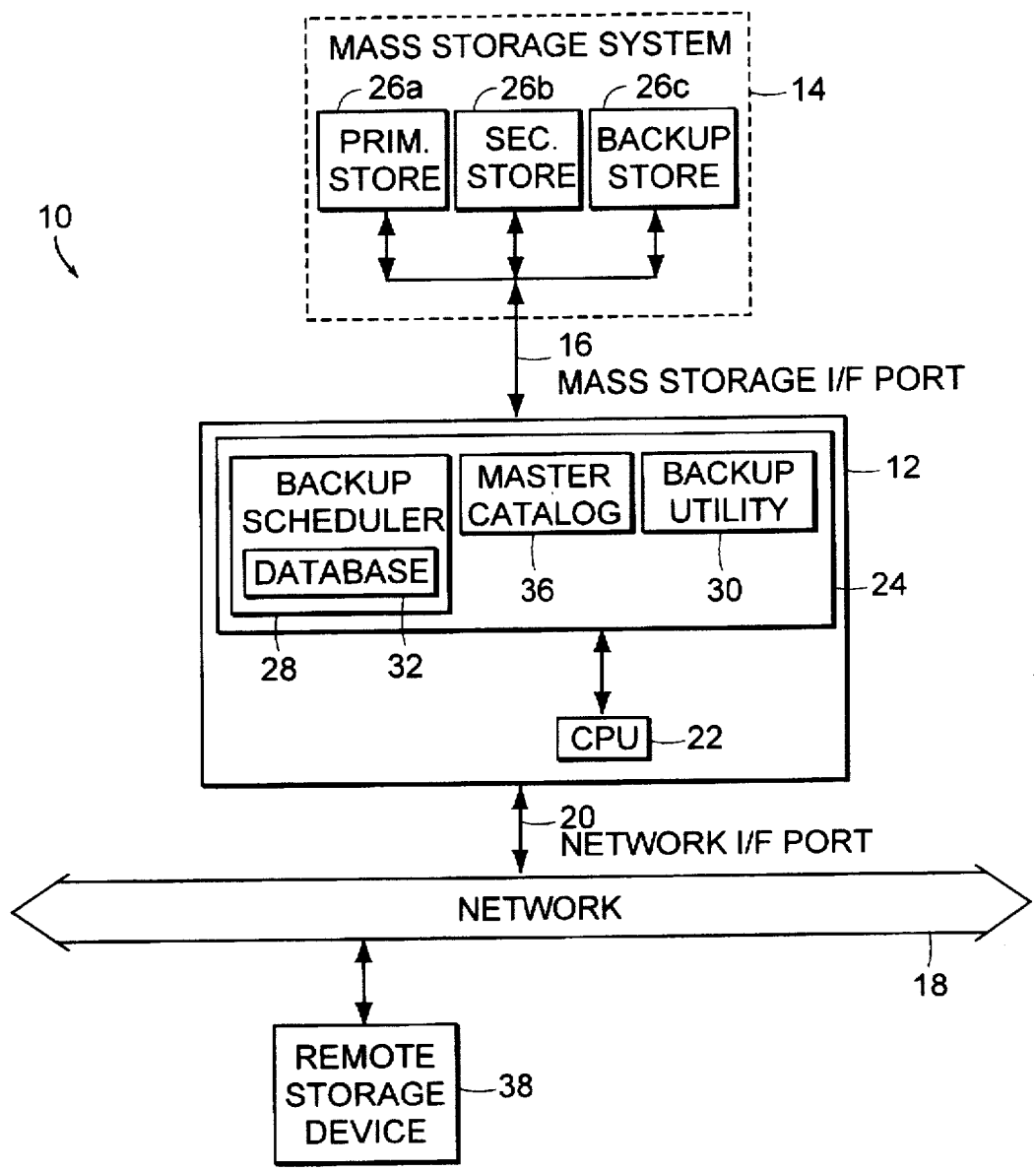
FIG. 1 is a computer system employing retroactive backup capability in accordance with the present invention.

Referring to FIG. 1, there is shown a computer system 10 having a server 12 coupled to a mass storage system 14 via a mass storage interface (I/F) port 16. The server is further connected to a network 18 via a network interface (I/F) port 20. The server includes a central processing unit (CPU) 22 operatively coupled to an internal memory 24 (e.g., RAM and/or ROM).

The mass storage system 14 includes a plurality of storage devices, including: a primary storage element (or "primary store") 26a, a secondary storage element (or "secondary store") 26b and a backup storage element (or "backup store") 26c. The primary store 26a can be a high speed Winchester type magnetic disk drive or the like, but can also include battery-backed RAM disk/or non-volatile flash EEPROM or other forms of high-performance, nonvolatile mass storage. The secondary storage element 26b, if present, can include a slower WORM-style optical storage drive or "floptical" storage drive or other secondary storage devices as the term will be understood by those skilled in the art. The backup storage element 26c can include magnetic disk drives, but more preferably comprises tape drives or other cost-efficient, removable backup storage devices. A backup copy of each file (or dataset) held in the primary or secondary storage element is preferably made on a periodic basis so that a relatively recent copy of a given file can be retrieved even in the case where the corresponding primary or secondary storage element suffers catastrophic failure, e.g., a head crash or destruction.

Installed on the server 12 in the internal memory 24 is a backup scheduler ("scheduler") 28 and a backup utility (or backup execution program) 30. Both are software routines executed on the CPU 22. The backup utility 30 makes backups of various data files held in the primary as well as any secondary storage elements. To avoid periods of active data usage and balance workload, backup copy making is controlled by the backup scheduler 28. As shown in the figure, the backup scheduler 28 includes a database 32 for storing and organizing backup schedules associated with data stored in the various storage media in the computer system. Also included in the database are selection criteria associated with the different backup set or save set levels defined by the backup schedule. The selection criteria may be the same for each level or may vary. The schedules and the selection criteria are specified and capable of being adjusted by the system administrator or user in accordance with changing system needs. Initially, the backup policy is set up as part of a storage management function during computer installation. The backup scheduler enforces the backup policy or schedule established by the system administrator (or user) and issues backup instructions/permission to the backup utility in accordance with that schedule.

In the illustrated embodiment, the server is also provided with a master catalog 36, which typically contains information describing files, directories of files or subdirectories, or volumes of directories defined therein. The master catalog identifies the name, location and other attributes of each file it describes. In addition to storage location and file name, other attributes in the master catalog include but are not limited to: file size; file chronology (e.g., creation date/time, latest revision date/time); and file user information. Thus, each user file stored in any of the storage elements can be identified according to select attributes by simply consulting the master catalog 36. Because the server 12 is a "backup" server, the master catalog contains backup catalog information created as part of the backup process. Typically, the backup catalog information includes the following: the backed-up directory structure; names, sizes and attributes of directories or files that were selected for backup; total number of files backed up in a save set; total size of the save set; and backup date or date the save set was made. Thus, each file has a timestamp indicating date/time of modification (or deletion) and each save set has a timestamp recording the backup date/time. The master catalog may be arranged according to many well-known organizations, including tree organizations, which start at a root directory and define a pathname from the root directory through subdirectory to a particular file.

Continuing to refer to FIG. 1, there is also connected to the network 18 a remote storage device 38. Generally, when a computer system is backed up, the data stored in devices such as the primary and secondary storage elements is copied to the backup storage element, which has a medium which can be preserved away from the computer system. Preferably, the backup storage element includes a backup volume in the form of a tape or diskette. In the present embodiment of the invention, the save sets created during backup may be stored on the backup storage element as thus described or over the network onto a remote storage device 38. In alternative embodiments, many more devices, including client and server computers and storage devices, could be connected to the network 18 and the backup scheduler 28 could control the backup of some or all of the devices on the network 18. It is also possible to connect to other networks where storage devices could reside.

FIG. 2 illustrates an exemplary multi-level backup scheme of the type commonly used in operating systems such as the UNIX operating system. The illustrated scheme utilizes both full and partial level saves. The level zero backup on the first Sunday is a full backup, copying all of the data in the system. Each higher level save copies all data modified since the most recent or last lower level save. The level 7 backup on the first Monday backs up all data modified since the time of the most recent lower level, that is, since the level 0 backup of Sunday. The level 7 backup on the first Tuesday also backs up all data modified since the time of the most recent lower level, the level 0 backup on Sunday. The level 7 on Tuesday includes the data backed up in the level 7 backup on Monday, thus effectively coalescing the data into a single save set. The level 8 backup on the first Wednesday backs up all data modified since the time of the most recent lower level, the level 7 backup on Tuesday. The backups continue in like manner until the second Sunday when a level 1 backup is performed. The level 1 backup backs up all data modified since the time of the most recent lower level, the level 0 of the previous Sunday, thereby coalescing the save sets of the whole week into one level 1 save set. It can be seen from the above that, normally, lower level saves contain more data than higher level saves.

Unlike the above-described normal level backup technique, retroactive backup capability of the present invention provides for a level backup of only data modified before a specified date. Accordingly, the backup scheduler software is adapted to back up data modified only prior to a specified date, that specified date preferably being the backup date of some previous incremental backup. Consequently, only data not already included in subsequent save sets is backed up. The scheduled backup performed by the system at the scheduled level is retroactive—that is, it is dated as if taken on the specified date. This means that, although there is never just one save set that contains all of the data, the number of save sets can be kept to a controlled number. This objective is achieved by performing the retroactive backup on at least as frequent a schedule as a normal level backup and by coalescing data contained in higher-level incremental save sets into lower level save sets.

Those skilled in the art will recognize that the retroactive backup is utilized in conjunction with and is dependent upon normal level backups, more particularly, daily (or some fairly frequent period) incremental backups. Thus, while some backups employ the retroactive technique, others capture all data modified since the previous lower level backup as described with reference to FIG. 2. These normal (nonretroactive) backups are usually performed during the week or whenever the computer system's load is the heaviest. In some instances, the system must capture all data modified since the most recent backup or risk losing that data. For example, if there is weekend activity and the system administrator doesn't want that data to be at risk until a normal Monday level backup, a fairly high level backup may be performed on Sunday before invoking a retroactive backup to do a lower level involving much more data.

Therefore, by employing a mix of normal and retroactive backups, it is possible to protect data and coalesce a reasonable amount of the data into one save set without copying data that has been subsequently modified/deleted. Although not all data is coalesced into one save set, there are fewer save sets to manage. Further, the save sets take less time to produce during a backup session than if all save sets had been coalesced into one save set.

Consider a file system on which a full backup is taken on Day 1 with incremental and level saves normally taken for the next 15 days. During that time, assume that file1 was modified on Day 16 and file2 was deleted on Day 21. By retroactively backing up on Day 22 with a full backup through Day 15, neither file1 nor file2 are copied by the full backup. In contrast, a full backup actually taken on Day 15 would have copied both file1 and file2. Typically, in an active file system, far more than two files would have been modified and/or deleted during the backup cycle.

In a slightly different illustration of the same example, assume that 20 gigabytes of data were deleted and 5 gigabytes of data were modified after Day 15 and before Day 22. By utilizing a retroactive backup, the full backup performed on Day 22 through Day 15 will copy 25 gigabytes less than if it had been performed on Day 15.

While the illustrated system has been described thus far as including retroactive backup support for regular backups of data residing on local and/or remote primary (and optionally secondary) stores, the retroactive backup capability of the present invention can be made applicable to other system configurations and operations without departing from the spirit of the invention. In one such alternative system implementation, and with reference to FIG. 1, the backup scheduler 28 and utility 30 in server 12 include a save set consolidation support mechanism (not shown) operating in accordance with the present invention. Typically, save set consolidation compacts save sets contained on some number of volumes into a single save set. In this implementation, the backup server need perform only an initial full backup and incremental saves thereafter because the incrementals (and any previous saves or save set consolidations of any level needed) are consolidated by the backup server into new save sets at a level (including level 0) specified by and subject to selection criteria defined in the database in the backup scheduler.

It can be appreciated that the consolidation activity is capable of being taken retroactively in the same manner as a regular backup and with the same advantageous results (i.e., fewer save sets to manage and process during a recovery, as well as reduced data replication during consolidation copying). Retroactive consolidation is particularly effective and provides other benefits in systems which require a high level of network and client interaction during backup periods. Although systems having consolidation support may require a greater number of tapes (or other media utilized for storing save sets) and/or tape drives than systems without consolidation support, the burden of backups is shifted primarily to the server. Thus, the consequences of network traffic and latency, as well as client resource usage, during network-wide backup processes are alleviated. Because the present invention is applicable to regular backups as well as consolidations, the term "backup" as used herein is intended to encompass both types of activities.

Figure 3A:
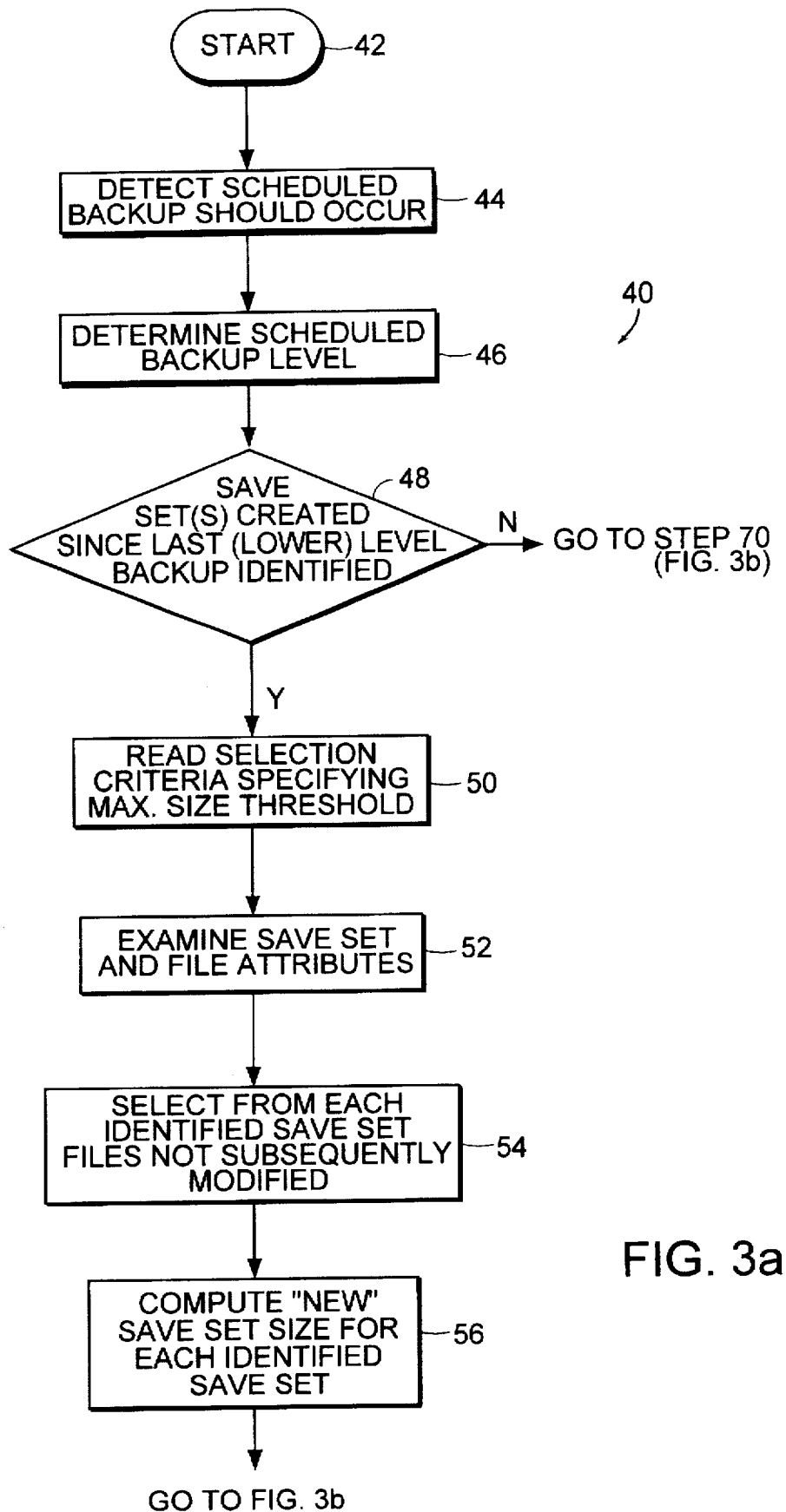
FIGS. 3a–b are flow charts illustrating a method of performing retroactive backups in accordance with the present invention.
Figure 3B:
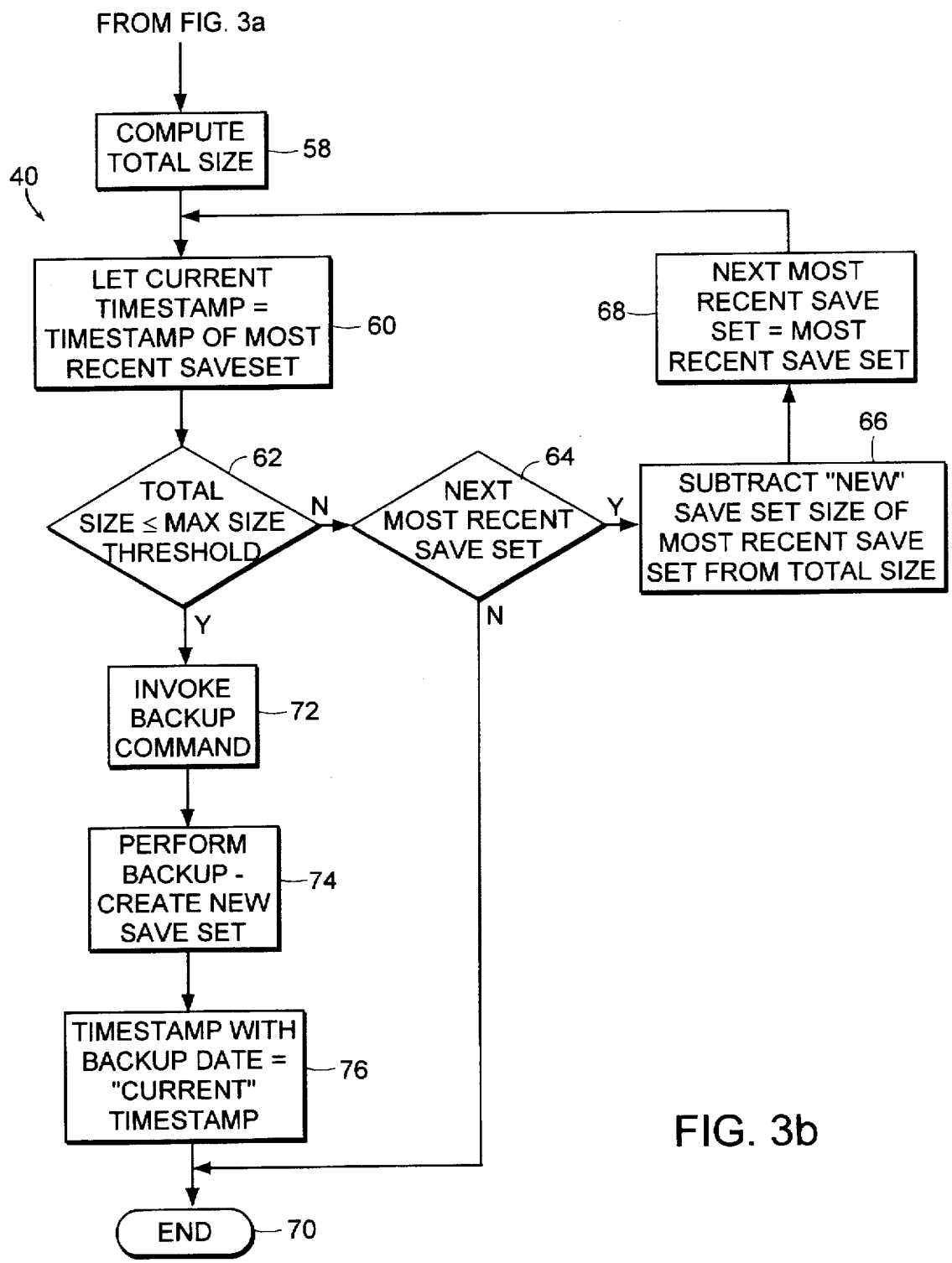

With reference to FIGS. 3a–b, there is illustrated a preferred method of performing retroactive backup 40 in accordance with the present invention. Now referring to FIG. 3a, the backup scheduler commences a backup session at step 42 by scanning the schedule in the database. If the scheduler detects that a backup is scheduled to occur 44, it determines what type (i.e., level) of backup should occur 46. Having determined the level of the scheduled backup, the scheduler consults the master catalog to identify any save sets created since the last lower level backup or last same level backup if the scheduled level is the lowest level 48. In the illustrated embodiment, the lowest level is a level 0. Since a level 0 begins at the start of time, the identified save set(s) will include the last same level backup if the level being performed is a level 0. If one or more such save sets are identified, the scheduler reads selection criteria corresponding to the scheduled backup level from the database 50.

In this embodiment, the selection criteria comprises a "maximum size" threshold associated with the scheduled level.

The maximum size threshold indicates a maximum size (i.e., quantity of data) that the save set at the scheduled level must not exceed. This parameter is chosen by the system administrator or user, who determines that this is the maximum amount of data that can be backed up in the allotted backup time, regardless of the level scheduled for backup.

Still referring to FIG. 3a, the scheduler now needs to ascertain which of the identified save sets contains files eligible for backup and achieves this objective by testing save set and file attributes against the selection criteria until the selection criteria is satisfied. Specifically, the scheduler consults the master catalog to examine the identified save set and file attributes 52. A "new" save set size is determined for and thus associated with each of the one or more identified save sets by selecting files that have not been modified or deleted as reflected in a more recent save set (thus eliminating the files contained in each save set that is superseded by the contents of a more recent save set) 54 and adding up the sizes of the selected files 56.

Referring now to FIG. 3b, once the "new" save set sizes have been computed, the total size is computed by adding the "new" save set sizes 58. At this point, the method proceeds in reverse timestamp order, beginning with the timestamp of the most recent save set as the "current" timestamp 60. Thus, at step 60, the most recent of the identified save sets is identified as the most recent save set. The total size is compared to the maximum size threshold to determine if the total size is less than or equal to the maximum size threshold 62. If the total size exceeds the threshold, the method performs the steps of: i) determining if there is a next most recent save set 64; ii) eliminating the most recent save set by subtracting the "new" save set size of the most recent save set from the total size 66; iii) making the next most recent save set the most recent save set 68; iv) updating the current timestamp at step 60; and v) comparing the resulting total size to the threshold. Steps i–v are performed repeatedly until there is no "next most recent save set" at step 64 or the resulting total size is less than or equal to the threshold at step 62. If the threshold has not been reached and there is no "next most recent save set" at step 64, then the method of the illustrated embodiment terminates at step 70 since the method cannot stay within the maximum size limits constraint and it is therefore likely that a backup operation could not be performed in the allotted time. Since normal backups are performed whether or not retroactive backups are taken, thus ensuring that all data that must be protected has been replicated at least once, this is permissible. In some implementations, it may be desirable to at least defragment/compact under these conditions; however, the time limit is overstepped. If the desired threshold level has been reached at step 62, the backup command is invoked 72 and a backup is performed for the eligible files (i.e., the selected files on the remaining one(s) of the identified save sets) 74. The newly created save set of the backed up files is then given a backup date that corresponds to the current timestamp 76 and the process is terminated 78.

In some backup schemes, the backup date of the new save set and the current timestamp may be the same. Alternatively, in some backup schemes, only one save set can have one specific timestamp. Consequently, the corresponding backup date of the newly created save set may approximate the current timestamp. The backup date of the new save set will be the current timestamp plus some amount of time X (e.g., X=number of seconds) which, when added to the current timestamp, makes the newly created save set's timestamp unique. Thus, the amount of time X will depend upon whether other file systems already used the current timestamp+X.

Referring back to step 48 as shown in FIG. 3a, if no save sets were created since the most recent lower level backup (or last same level backup if the scheduled level is the lowest level, e.g., level 0), then the last lower (or same) level backup is the most recent backup and there is no activity to be performed by the retroactive backup process. Therefore, the method terminates at step 70 (see FIG. 3b).

In the above-described manner, the backup scheduler is able to determine for the scheduled level exactly how many save sets created subsequent to the last lower level save set (or last same level save set if the scheduled level is the lowest level) the system is able to coalesce into a single new save set.

Figure 4:
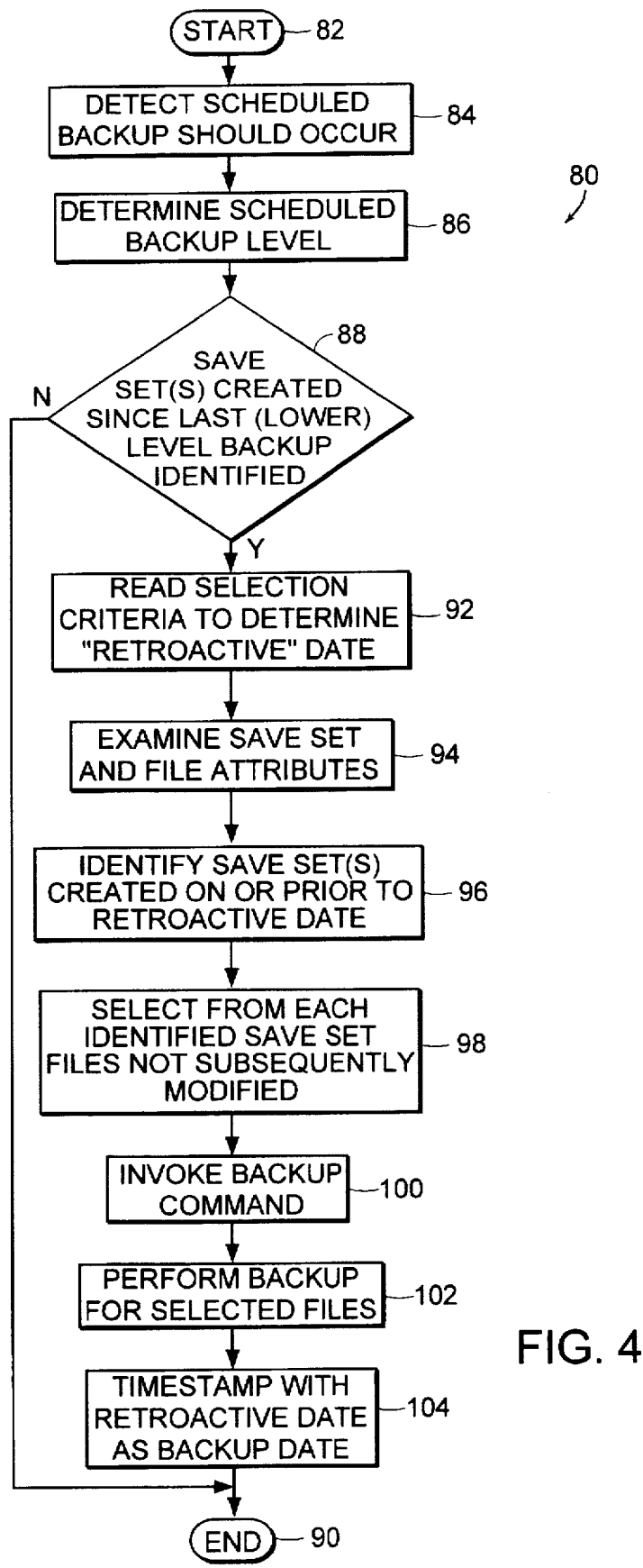
FIG. 4 is a flow chart illustrating an alternative embodiment of the method of performing a retroactive backup in accordance with the present invention.

FIG. 4 depicts an alternative embodiment of the retroactive backup mechanism 80. Unlike the method shown in FIGS. 3a–b, the method in this embodiment employs selection criteria specifying a date(/time) threshold or "retroactive" backup date—preferably corresponding to the date of a previous incremental backup—to define a maximum backup interval. The backup session commences at step 82. The backup scheduler determines from the backup schedule that a backup should be performed 84 and identifies the level of the scheduled backup 86. If the scheduler determines that no save sets were created since the last or most recent lower level backup (or last same level backup if the scheduled level is the lowest level, e.g., level 0) at step 88, the method terminates at step 90.

Returning to step 88, if one or more save sets were created since the last lower level (or last same level if the scheduled level is the lowest level) backup, the scheduler checks the selection criteria for the scheduled level 92 and ascertains which files are eligible for backup by performing the following steps: examining the file attributes associated with any save sets created since the last lower level backup (or last same level e.g., level 0 if doing a level 0, and including the last same level, e.g., a level 0 if doing a level 0) 94, identifying the save sets created prior to or on the date specified by the selection criteria 96 and selecting from each identified save set the files that have not been subsequently modified or deleted 98. Consequently, only those files not modified or deleted since the retroactive backup date are selected. The selected files are those eligible for backup. Once the files to be backed up have been selected, the scheduler sends the backup instruction and provides the eligible (selected) files to the backup utility 100, which then creates a new save set at the scheduled backup level 102. The new save set, which includes the selected files, is timestamped with a backup date that corresponds to (i.e., is the same as or approximates) the date/time specified by the selection criteria 104. Again, there is a need to approximate the specified date/time when timestamp uniqueness is a requirement.

In sum, the system performs a backup at the scheduled level, but the scheduled backup is taken only through the date provided. Therefore, a reasonable amount of data is compacted into one save set without needlessly copying data that has been modified or deleted subsequent to that date. The subsequently modified data remains captured on the incremental backups taken since the retroactive date.

The benefits associated with the use of the retroactive backup of the present invention are now illustrated with reference to FIG. 6 AND Tables 1–6. FIG. 6 depicts an exemplary quarterly backup schedule. According to the quarterly backup schedule shown in the figure, a full backup or level 0 save is performed once per quarter. On each succeeding Sunday for the next three weeks, a save of one higher-numbered level is made. All of the data modified during each week is saved and coalesced into one save set. During Monday through Saturday, no more than three save sets are added to the accumulation of save sets that are needed for system recovery. If there is a fifth Sunday in the month, a level 6 is performed on that fifth Sunday.

In this particular example, consider a file system normally containing 250 gigabytes of data. At the end of each week, assume that approximately 5% of this data is either modified or new data replaces existing data. Further assume that the adjustable selection criteria stored in the database specify that the Sunday levels can never exceed 120 gigabytes of data. Therefore, the maximum size threshold is 120 GB.

Tables 1–6 below give a picture of a possible backup scenario for each month's level content in gigabytes for each save set applicable to a full recovery utilizing the above-defined selection criteria (maximum size threshold =120 GB). For each table, the previous Sunday is shown as the beginning for sake of continuity. Each quarter is assumed to have one 5-Sunday month.

TABLE 1

| | Quarter 1, Month 1 | | | | |
|---|---|---|---|---|---|
| Level | Q1W1 | Q1W2 | Q1W3 | Q1W4 | Q1W5 |
| 0 | 250 | 238 | 225 | 214 | 202 |
| 1 | | | | | 48 |
| 2 | | | | | |
| 3 | | 12 | 12 | 11 | |
| 4 | | | 13 | 13 | |
| 5 | | | | | 12 |

TABLE 2

| | Quarter 1, Month 2 | | | | |
|---|---|---|---|---|---|
| Level | Q1W5 | Q1W6 | Q1W7 | Q1W8 | Q1W9 |
| 0 | 202 | 191 | 179 | 168 | 156 |
| 1 | 48 | 47 | 46 | 45 | 44 |
| 2 | | | | | 50 |
| 3 | | 12 | 12 | 12 | |
| 4 | | | 13 | 13 | |
| 5 | | | | 12 | |

TABLE 3

| | Quarter 1, Month 3 | | | | |
|---|---|---|---|---|---|
| Level | Q1W9 | Q1W10 | Q1W11 | Q1W12 | Q1W13 | Q2W1 |
| 0 | 156 | 146 | 134 | 123 | 113 | 103 |
| 1 | 44 | 43 | 43 | 42 | 41 | 40 |
| 2 | 50 | 49 | 48 | 48 | 46 | 45 |
| 3 | | 12 | 12 | 12 | 12 | 12 |
| 4 | | | 13 | 13 | 13 | 13 |
| 5 | | | | 12 | 12 | 12 |
| 6 | | | | | 13 | 13 |
| 7 | | | | | | 12 |

With reference to Tables 1–3 above, all levels 1–6 were able to coalesce all data and remain within the 120 gigabyte limit; however, the level 0 on the first Sunday of Quarter 1 was able to coalesce only data contained within the previous level 0, i.e., it saved all data modified before the first Sunday of Quarter 1. Thus, it effectively defragmented the previous level 0 and enabled those tapes to be recycled at the appropriate time.

TABLE 4

| | Quarter 2, Month 1 | | | | |
|---|---|---|---|---|---|
| Level | Q2W1 | Q2W2 | Q2W3 | Q2W4 | Q2W5 |
| 0 | 103 | 93 | 84 | 74 | 66 |
| 1 | 40 | 38 | 36 | 34 | 72 |
| 2 | 45 | 44 | 43 | 42 | |
| 3 | 12 | 75 | 75 | 75 | 75 |
| 4 | 13 | | 12 | 12 | 12 |
| 5 | 12 | | | 13 | 13 |
| 6 | 13 | | | | |
| 7 | 12 | | | | 12 |

TABLE 5

| | Quarter 2, Month 2 | | | | |
|---|---|---|---|---|---|
| Level | Q2W5 | Q2W6 | Q2W7 | Q2W8 | Q2W9 | Q2W10 |
| 0 | 66 | 58 | 49 | 42 | 37 | 34 |
| 1 | 72 | 68 | 66 | 63 | 60 | 57 |
| 2 | | | | | | 84 |
| 3 | 75 | 99 | 98 | 95 | 91 | |
| 4 | 12 | | 37 | 37 | 37 | 37 |
| 5 | 13 | | | 13 | 13 | 13 |
| 6 | | | | | 12 | 12 |
| 7 | 12 | 25 | | | | 13 |

TABLE 6

| | Quarter 2, Month 3 | | | | |
|---|---|---|---|---|---|
| Level | Q2W10 | Q2W11 | Q2W12 | Q2W13 | Q3W1 |
| 0 | 34 | 32 | 29 | 27 | 68 |
| 1 | 57 | 55 | 54 | 50 | |
| 2 | 84 | 78 | 69 | 63 | 60 |
| 3 | | 85 | 85 | 85 | 84 |
| 4 | 37 | | | 13 | 13 |
| 5 | 13 | | | 12 | 12 |
| 6 | 12 | | | | |
| 7 | 13 | | | | 13 |

In Quarter 2 (as shown in Tables 4–6 above), the first level 3 coalesces all data since the level 2. The level 1 on Q2W5 only coalesces data modified before the previous level 3, i.e., it effectively coalesces the level 1 and 2 data. The next level 3 compacts all data modified after the level 2 except for the level 7 that was saved on the previous day. The next level 2 defragments the previous level 3 into a level 2. The level 0 compacts all data modified before the level 2.

While at no time is all the data compacted into one save set, neither is it ever necessary to re-copy any more than 120 gigabytes of data on any Sunday. At the same time, the total number of save sets never exceeds the worst possible scenario using the same schedule without retroactive backups.

Although the above description has proceeded with reference to a specific embodiment of the invention, the invention is not necessarily limited to the particular embodiment shown herein. It is to be understood that various other adaptations and modifications may be made within the spirit and scope of the invention as set forth by the claims.

What is claimed is:

1. A method of retroactively backing up files in a computer system, comprising:

establishing a backup schedule employing one or more backup levels having selection criteria associated therewith, the associated selection criteria operating to define a point through which the backup at the backup level with which the selection criteria is associated is to be taken;

maintaining one or more save sets, each storing one or more files backed up in accordance with the backup schedule;

associating attributes with each save set and each file stored therein;

detecting that a backup is scheduled to occur;

determining the established level of the scheduled backup;

identifying any save sets created since a last lower level save set or last same level save set if the established level of the scheduled retroactive backup is the lowest level;

reading the selection criteria associated with the established level of the scheduled backup;

ascertaining which of the identified save sets has files eligible for backup by testing the attributes associated with the files against the selection criteria until the selection criteria is satisfied;

backing up the eligible files, thereby creating a new save set at the scheduled backup level; and timestamping the new save set with a date corresponding to the backup date of the most recent one of the identified save sets having files eligible for backup.

2. A method of retroactively backing up files stored in a computer system according to claim 1, wherein the selection criteria comprises a maximum size threshold, the maximum size threshold being the amount of data that may be backed up in an allotted backup period.

3. A method of retroactively backing up files stored in a computer system according to claim 2, wherein the step of ascertaining comprises:

examining the attributes associated with the identified save sets and files stored therein;

selecting, from each identified save set, files not subsequently modified or deleted;

adding the sizes of the selected files to give a new save set size;

computing a total size by adding together the new save set sizes;

comparing the total size to the maximum size threshold; and if the total size exceeds the maximum size threshold, then repeatedly performing until the total size reaches the maximum size threshold the steps of:

identifying a most recent save set from among the identified save sets;

determining that there is a next most recent save set;

eliminating the most recent save set by subtracting the new save set size of the most recent save set from the total size, thereby making the next most recent save set the most recent save set; and comparing the total size to the maximum size threshold; and whereby the selected files on any remaining ones of the identified save sets are eligible for backup.

4. A method of retroactively backing up files stored in a computer system according to claim 1, wherein the selection criteria specifies a retroactive backup date corresponding to a date of a previous backup.

5. A method of retroactively backing up files stored in a computer system according to claim 4, wherein the step of ascertaining comprises:

examining the associated file attributes of the files in the identified save sets;

identifying the one or more of the identified save sets created on or prior to the retroactive backup date; and selecting as eligible those files from each of the identified save sets that have not be subsequently modified or deleted.

6. A method of retroactively backing up files stored in a computer system, comprising:

establishing one or more backup levels, each backup level having an associated selection criteria for performing a backup at the backup level, the associated selection criteria specifying a retroactive backup date corresponding to a date of a previous backup;

associating file attributes with each file;

scheduling backups to be performed at the established backup levels;

detecting that a backup is scheduled to occur;

determining the established level of the scheduled backup;

ascertaining which of the files are eligible for backup, the eligibility being defined by the established level of the scheduled backup and the retroactive backup date specified by the selection criteria;

selecting for backup ones of the files having a date of last modification occurring between the date of a last backup having an established level lower than the established level of the scheduled backup or equal to the established level of the scheduled backup if the established level is the lowest established level and the specified retroactive backup date;

creating a new save set at the established scheduled backup level, the new save set including copies of the selected files; and timestamping the new save set with the specified retroactive backup date.

7. An apparatus for retroactively backing up files stored in a computer system, comprising:

a backup schedule employing one or more backup levels, each backup level having selection criteria associated therewith, the associated selection criteria operating to define a point through which the backup at the backup level with which the selection criteria is associated is taken;

at least one save set, each save set storing one or more files backed up in accordance with the backup schedule, each save set and file having attributes associated therewith;

means for detecting that a backup is scheduled to occur;

means for determining the established level of the scheduled backup;

means for identifying any save sets created since a last lower level save set or last same level save set if the established level of the scheduled backup is the lowest level;

means for reading the selection criteria associated with the established level of the scheduled backup;

means for ascertaining which of the identified save sets has files eligible for backup by testing the attributes associated with the files against the selection criteria; and means, responsive to the means for ascertaining, for backing up the eligible files, the means for backing up the eligible files thereby creating a new save set at the scheduled backup level, the new save set being timestamped with a date corresponding to the backup date of the most recent one of the identified save sets having files eligible for backup.

8. An apparatus for retroactively backing up files stored in a computer system according to claim 7, wherein the selection criteria comprises a maximum size threshold, the maximum size threshold being the amount of data that may be backed up in an allotted backup period.

9. An apparatus for retroactively backing up files stored in a computer system according to claim 8, wherein the means for ascertaining comprises:

means for examining the attributes associated with the identified save sets and files stored therein;

means for selecting, from each identified save set, files not subsequently modified or deleted;

means for adding the sizes of the selected files to give a new save set size;

means for computing a total size by adding together the new save set sizes;

means for comparing the total size to the maximum size threshold; and means for repeatedly performing until the total size reaches the maximum size threshold if the total size exceeds the maximum size threshold, the steps of:

identifying a most recent save set from among the identified save sets;

determining that there is a next most recent save set;

eliminating the most recent save set by subtracting the new save set size of the most recent save set from the total size, thereby making the next most recent save set the most recent save set; and comparing the total size to the maximum size threshold; and whereby the selected files on any remaining ones of the identified save sets are eligible for backup.

10. An apparatus for retroactively backing up files stored in a computer system according to claim 7, wherein the selection criteria specifies a retroactive backup date corresponding to a date of a previous backup.

11. An apparatus for retroactively backing up files stored in a computer system according to claim 10, wherein the means for ascertaining comprises:

means for examining the associated file attributes of the files in the identified save sets;

means for identifying the one or more of the identified save sets created on or prior to the retroactive backup date; and means for selecting as eligible those files from each of the identified save sets that have not be subsequently modified or deleted.

\* \* \* \* \*